(12) United States Patent
Nicholson (10) Patent No.: US 7,322,627 B1
(45) Date of Patent: Jan. 29, 2008

(54) VERTICALLY ADJUSTABLE TRUCK BED

(76) Inventor: Clinton Jay Nicholson, 13472 W. Outer Dr., Detroit, MI (US) 48239

( * ) Notice: Subject to any disclaimer, the term of this patent is extended or adjusted under 35 U.S.C. 154(b) by 91 days.

(21) Appl. No.: 11/388,717

(22) Filed: Mar. 24, 2006

(51) Int. Cl.
*B60G 17/00* (2006.01)
*B60P 1/02* (2006.01)

(52) U.S. Cl. .................................... 296/25; 280/6.151

(58) Field of Classification Search ................. 296/25, 296/26.01–26.05, 183.1, 183.2, 184.1, 50, 296/51, 57.1, 204, 193.07; 414/345, 347, 414/495; 280/5.501, 5.503, 5.52, 6.151
See application file for complete search history.

(56) References Cited

U.S. PATENT DOCUMENTS

| | | | | |
|---|---|---|---|---|
| 3,024,931 A * | 3/1962 | Grover et al. | ............... | 414/494 |
| 3,744,841 A * | 7/1973 | Schmidt | ................... | 296/26.04 |
| 4,580,830 A * | 4/1986 | Holt et al. | ..................... | 296/25 |
| 5,035,462 A * | 7/1991 | Page et al. | ............... | 296/183.1 |
| 5,129,671 A * | 7/1992 | Walton | ....................... | 280/5.51 |
| 5,137,300 A * | 8/1992 | Walton | ..................... | 280/5.503 |
| 5,288,197 A * | 2/1994 | Harris | ........................ | 414/495 |
| 5,354,092 A * | 10/1994 | Calvert | ............... | 280/124.102 |
| 5,630,693 A * | 5/1997 | Sobina | ........................ | 414/495 |
| 5,906,470 A * | 5/1999 | Desjardins | .................. | 414/495 |
| 5,934,026 A * | 8/1999 | Green | .......................... | 52/143 |
| 5,951,233 A * | 9/1999 | Boucher et al. | ............ | 414/495 |
| 6,126,220 A * | 10/2000 | Brasher | .................... | 296/26.04 |
| 6,273,435 B1 * | 8/2001 | Stringer | .................... | 280/6.151 |
| 6,276,738 B1 * | 8/2001 | Marshall | ..................... | 296/57.1 |
| 6,343,825 B1 * | 2/2002 | Gee | ............................. | 296/25 |
| 6,425,627 B1 * | 7/2002 | Gee | ......................... | 296/184.1 |
| 6,568,897 B2 * | 5/2003 | Kendall | ...................... | 414/495 |
| 6,705,681 B2 * | 3/2004 | Russ | ............................ | 298/29 |
| 6,779,825 B1 * | 8/2004 | Greenert et al. | ............. | 296/51 |
| 6,921,238 B2 * | 7/2005 | Bellis, Jr. | .................... | 414/345 |
| 7,093,876 B2 * | 8/2006 | Romig et al. | ................. | 296/50 |
| 7,111,908 B1 * | 9/2006 | Mills | ........................ | 298/22 R |
| 7,165,800 B2 * | 1/2007 | Thiele et al. | ................. | 296/50 |
| 7,223,057 B2 * | 5/2007 | Bellis, Jr. | .................... | 414/345 |

* cited by examiner

*Primary Examiner*—D. Glenn Dayoan
*Assistant Examiner*—Greg Blankenship (57) ABSTRACT

A truck is disclosed with a vertically adjustable bed to facilitate cargo loading and unloading. The truck includes a U-shaped frame within which the vertically adjustable bed is located. The vertically adjustable bed is movable between elevated and lowered positions by hydraulic cylinders. When in its fully elevated position, the vertically adjustable bed is secured to the U-shaped frame by bed locking pins. When the vertically adjustable bed is in its fully elevated position, left and right tailgate doors are secured to each other by tailgate door locking screws. The left and right tailgate doors are secured to the vertically adjustable bed by tailgate bed locking pins and a lateral recess in the left and right tailgate doors designed to receive the rear edge of the vertically adjustable bed.

6 Claims, 11 Drawing Sheets

END VIEW OF FRAME

END VIEW OF PIN

BOTTOM VIEW OF PIN

VIEW A

VIEW E

CONTACT IN RIGHT + LEFT
TAIL-GATE DOORS

LEFT TAIL-GATE

VERTICALLY ADJUSTABLE TRUCK BED

TECHNICAL FIELD

This disclosure relates generally to the field of vehicles with cargo beds capable of raising and lowering while remaining in a horizontal orientation.

BACKGROUND

Trucks have long been used to transport cargo of various weights and dimensions. In order to be transported, the cargo must first be loaded onto the truck bed and then off-loaded upon arrival at the cargo destination. Handling heavy cargo or cargo with unusual dimensions is often problematic due to the loading and unloading difficulties that are presented with such loads. There are various types of trucks commercially available, but all have a fixed cargo bed design and, therefore, require special equipment or techniques for loading and unloading cargo onto the bed.

To load cargo onto a fixed-bed truck, it is typical to employ a temporary ramp that is rigged with one end of the ramp resting against the tailgate of the truck and the other end of the ramp resting on the ground. The cargo must then be pushed, pulled, or rolled up or down the ramp as the case may be to place the cargo on the bed of the truck or to move it off of the truck bed. Another way to load cargo onto a truck bed is to back up to a platform that is at about the same elevation as the truck bed and then push, pull, slide or roll the cargo on or off the truck bed. Still another way to load cargo onto, or off of, a truck bed is to use equipment designed to lift and move heavy loads, such as a dolly, chain fall, or lift truck.

While each of the aforementioned means can be used to move cargo onto or off of a truck bed, each has its limitations and drawbacks. Ramps, for example, are typically temporary devices that require space behind the vehicle. The ramps may slip off of the truck bed or tailgate and, unless the ramps are unusually long, present a steep angle that must be overcome in moving the cargo up the ramp. If the cargo to be loaded is at a residence or in the middle of a forest, for example, there is usually no platform at the same elevation as the truck bed to back up to in order to load or unload the cargo. Special equipment may not always be available and, if available, may be difficult, if not impossible, to use in certain conditions or locations.

Pivoting truck beds and vertically-adjustable tailgates were introduced as having advantages that overcome the drawbacks and limitations of a fixed truck bed arrangement. Pivoting beds include a bed pivotally connected to a chassis above the rear axle. The front of the bed is releasably connected to the vehicle to maintain the bed in a substantially horizontal orientation. Cargo loading is accomplished by releasing the front of the bed allowing the bed to pivot until the rear of the bed contacts the surface on which the vehicle is positioned. The bed then forms a ramp onto which the cargo may be rolled, pulled or pushed.

Vertically-adjustable tailgates are typically pneumatically operated such that the tailgate can be raised or lowered via pneumatic controls. While these vertically-adjustable tailgates can be found on cube vans and stake trucks, they are not usually found on pick-up trucks.

While eliminating some of the drawbacks and limitations of fixed truck beds, pivoting beds and vertically-adjustable tailgates have their own drawbacks and limitations. Even though pivoting beds reduce some loading problems, the heavy cargo must be pushed or pulled up the inclined bed which is then prone to unexpected movement when the center of gravity of the cargo moves past the pivot point of the bed. Vertically adjustable tailgates are limited in the size and weight of cargo they can handle and may require counter-balancing if the load is extremely heavy.

In still another attempt to eliminate these drawbacks and limitations, there has been shown an adjustable bed pivotally disposed in a U-shaped frame of a vehicle wherein boomerang linkages allow the bed to move vertically up and down while maintaining a substantially horizontal orientation. In yet another attempt, a vehicle is provided with an elevatable cargo box in a U-shaped cargo area wherein the cargo box is movable between elevated and lowered positions by cables. However, these attempts require an elaborate linkage system to facilitate movement of the bed beyond the frame of the vehicle in the one case, and an elaborate cable system in the other case.

Another common disadvantage with all vertically moveable truck beds is the lack of stability and support in the cargo-carrying section of the truck. The typical U-shaped frame in all vehicles with vertically-moveable beds does not have the structural rigidity and support necessary to provide a horizontally stable bed while the vehicle is in motion.

From the foregoing, it would be desirable to have a truck with a bed capable of being raised and lowered for ease in loading and unloading of cargo. It would also be desirable to have a truck with a vertically adjustable bed that has more frame stability and structural support to provide a horizontally stable bed while the vehicle is in motion.

SUMMARY

Disclosed herein is a truck with a vertically adjustable bed that satisfies these needs. Heretofore, there has not been a truck with a bed that could be easily raised and lowered for more efficient loading and unloading of cargo, with frame stability and structural integrity in its cargo-carrying rear section to provide horizontal stability while in motion.

The disclosure herein is directed to a truck with a vertically adjustable bed with frame stability and structural integrity. The truck includes a frame assembly adapted to receive and support a front suspension, rear suspension, vertically adjustable bed, and side-opening tailgate doors.

There is also disclosed a bed locking mechanism, a tailgate door locking mechanism, and a bed centering mechanism all of which work in combination to provide structural integrity and frame support for the truck and its cargo-carrying section.

While the various embodiments of the disclosure are described with reference to a truck with structural stability and a bed capable of being raised lowered by hydraulic cylinders while remaining in a horizontal orientation, it is to be understood that there may be combinations of equipment and devices that could be used to raise and lower a truck bed and other means to provide structural support and stability to a truck. There is no truck with the disclosed structural support, stability elements and a bed capable of vertically raising and lowering while remaining in a horizontal orientation. Such a truck would find utility in a variety of applications. By way of example and not a limitation, if one wanted to transport a motorcycle using the truck with the vertically-adjustable bed disclosed herein, a person would open the tailgate doors, activate the control to lower the bed, roll the motorcycle onto the vertically adjustable bed, activate the control system to raise the bed to its transport position, and then close and lock the tailgate doors. Other uses for, and the advantages of, such a truck with a vertically adjustable truck bed will become immediately obvious to one skilled in the art.

DESCRIPTION

What is being disclosed is a truck having a vertically adjustable bed with novel features that give the cargo-carrying section of the truck stability and structural integrity. The novel features that are considered characteristic of the invention are set forth with particularity in the claims. Other objects, advantages and applications will be best understood and become apparent from the following description of the various embodiments when read in connection with the accompanying drawings.

Figure 1:
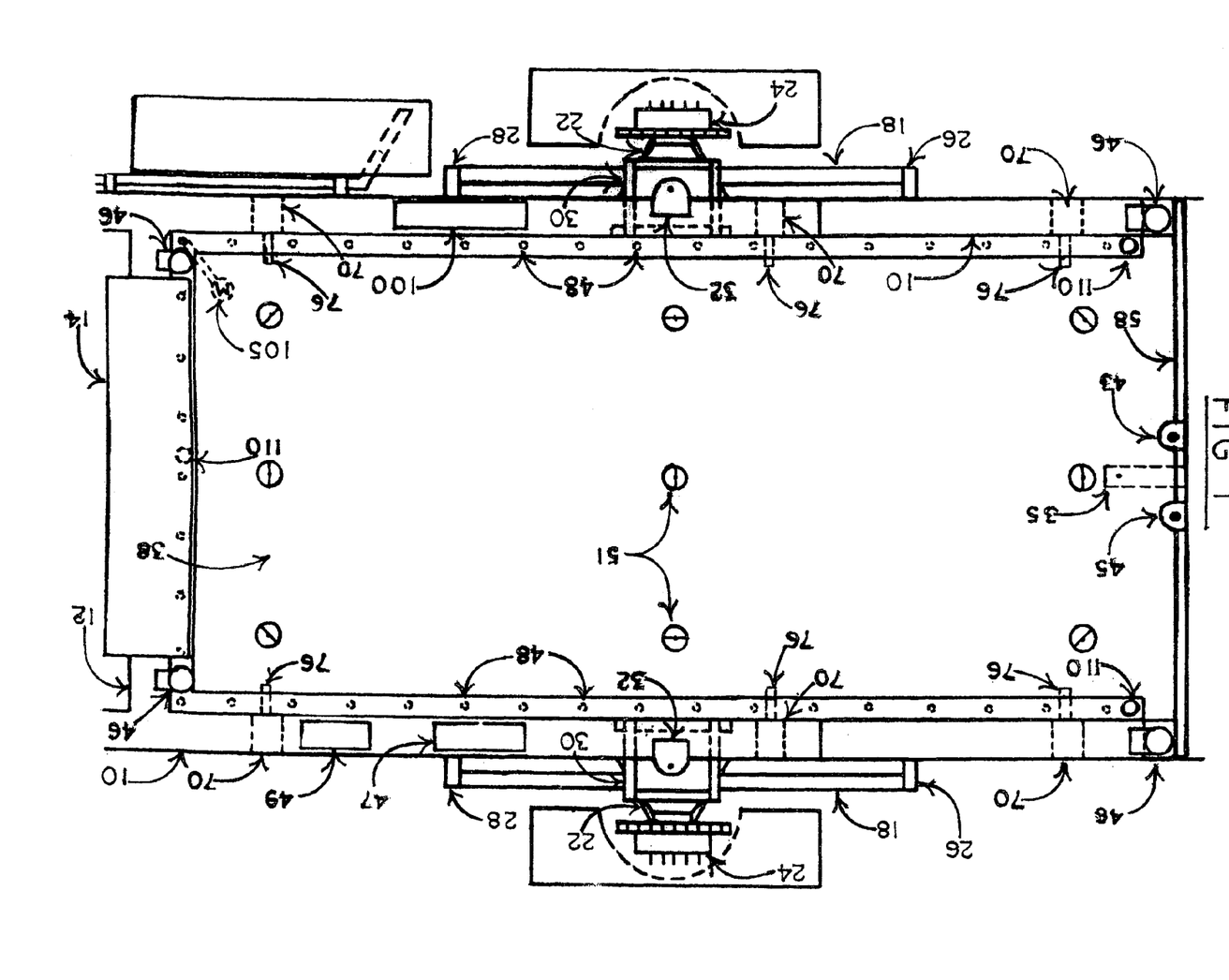
FIG. 1 is a top view of the U-shaped frame.

Referring to FIG. 1, the truck frame is divided into front and back sections. The front section is defined by the area between the frame cross member 12 supporting the gas tank 14 forward. A front suspension (not shown) is disposed in the front section. The front suspension (not shown) preferably includes a conventional front wheel drive truck suspension (not shown). That portion of the truck frame from the frame cross member 12 supporting the gas tank 14 rearward is defined as the U-shaped frame 10. The U-shaped frame 10 supports the hydraulic pump 47 and the hydraulic fluid reservoir 49 which provide the force to drive the hydraulic cylinders 46 in their upward or downward movement. The vertically adjustable bed 38 is attached to at least four hydraulic cylinders 46. At least two hydraulic cylinders 46 are disposed forwardly on the frame cross member 12 supporting the gas tank 14 and at least two hydraulic cylinders 46 are disposed rearwardly, one each located on the left and right sides of the U-shaped frame 10. The hydraulic cylinders 46 allow the vertically adjustable bed 38 to move both upwardly and downwardly while maintaining the vertically adjustable bed 38 in a substantially horizontal orientation. A rear suspension assembly includes two mirror image rear suspension assemblies supported by and disposed on opposite sides of the U-shaped frame 10. The rear suspension assembly is disposed in the U-shaped frame 10 and will be more completely defined with reference to FIG. 2.

Again with reference to FIG. 1, the U-shaped frame 10 supports the processor 100 which provides control over the various functions and movements of the vertically adjustable bed 38. A plurality of bed centering pins 48 are disposed on the bottom perimeter of the U-shaped frame 10. The bed centering pins 48 give the vertically adjustable bed 38 horizontal stability when the bed centering pins 48 are inserted into the bed centering pin locators 50 that are located around the perimeter of the vertically adjustable bed 38. Disposed within the U-shaped frame 10 are at least four bed locking pins 70, with six bed locking pins 70 being the preferred embodiment. The bed locking pins 70 give the vertically adjustable bed 38 vertical stability when the bed locking pins 70 are inserted into the bed locking pin recesses 76. The bed locking pin recesses 76 are located around the perimeter of the vertically adjustable bed 38 and are aligned to receive the bed locking pins 70. At least one proximity switch 110, with three proximity switches 110 being the preferred embodiment, is located on the underside of the U-shaped frame 10 to provide positive indication that the vertically adjustable bed 38 is in its fully raised position.

Still with reference to FIG. 1, the vertically adjustable bed 38 is configured with a trailer hitch recess 35 that is designed to receive a variety of trailer hitches (not shown). The vertically adjustable bed 38 is also configured with a plurality of cargo bed tie down recesses 51 that are designed to receive various devices used to secure cargo (not shown) to a truck bed. The vertically adjustable bed 38 is also configured with left and right tailgate latching pins 43,45 that are designed to secure the left and right tailgate doors 52,54 to the vertically adjustable bed 38. The vertically adjustable bed is designed with a rear bed edge 58 that is beveled preferably to at least a 45° angle to fit into the tailgate lateral recess 64 located on the bottom region of the tailgate doors 52,54

Figure 2:
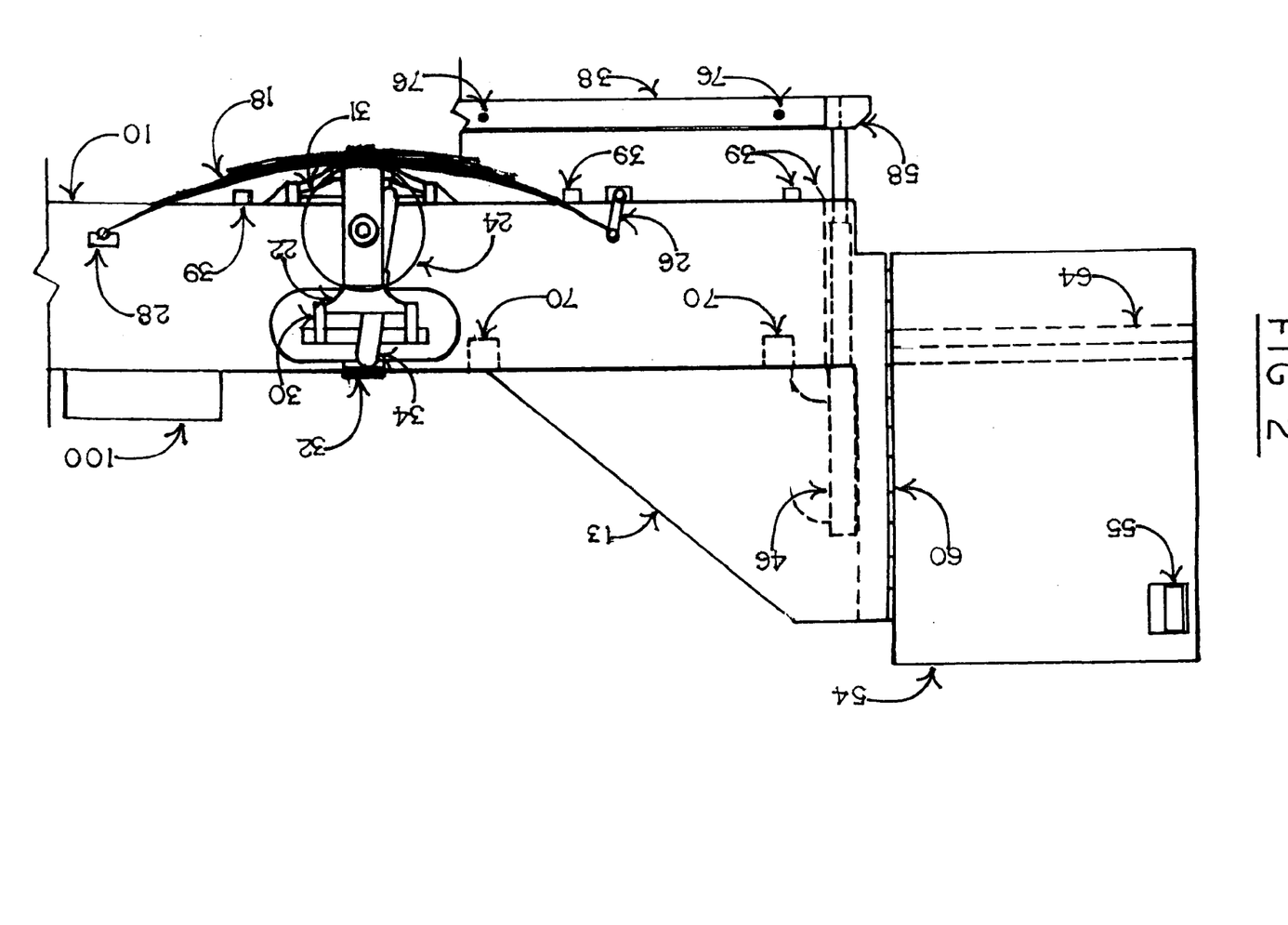
FIG. 2 is a side view of the rear suspension and outside of the U-shaped frame.

Referring to FIG. 2, the rear suspension assembly is disposed in the U-shaped frame 10. The rear suspension assembly includes two mirror image rear suspension assemblies supported by and disposed on opposite sides of the U-shaped frame 10. The rear suspension assembly includes an upper rocker arm 30, lower rocker arm 31, leaf spring 18 and shock absorber 20 that are interconnected with each other through the upper rocker arm 30 and lower rocker arm 31. The rear suspension assembly also includes a wheel support bracket 22 attached to the rear wheel hub 24. The leaf spring 18 has one end attached to a leaf spring rocker support bracket 26 and the other end to a leaf spring support bracket 28. The leaf spring rocker support bracket 26 and the leaf spring support bracket 28 are suitably attached to the U-shaped frame 10. The upper rocker arms 30 are pivotably attached to the upper region of the wheel support bracket 22. Two lower rocker arms 31 are pivotably attached to the lower region of the wheel support bracket 22. A shock absorber upper mounting bracket 32 is disposed on the U-shaped frame 10 between the upper rocker arms 30. A shock absorber 34 is attached to the shock absorber upper mounting bracket 32 at its top end and attached to the lower rocker arm 31 at its bottom end. This rear suspension assembly provides strength and assists in maintaining proper alignment of the rear wheels while the truck is in motion. A plurality of bed guide tabs 39 are attached to the U-shaped frame 10 and guide, align and position the vertically adjustable bed 38 when it is moving upward to ensure that it is vertically and horizontally positioned to be aligned with the U-shaped frame 10.

Still with reference to FIG. 2, left tailgate door 52 and right tailgate door 54 open to their respective sides by a tailgate door hinges 60 attached to each tailgate door 52,54, the U-shaped frame 10, and the tailgate support extension 13. A right tailgate door handle 55 is located on the upper region of the right tailgate door 54. The right tailgate door 54 is opened by the use of right tailgate door handle 55. The right tailgate door handle 55 contains a two-position switch (not shown) with built-in contactors (not shown). The tailgate support extension 13 is attached to the U-shaped frame 10 and is designed to give support and stability to the tailgate doors 52, 54. The tailgate door lateral recess 64 receives the rear bed edge 58 when the vertically adjustable bed 38 is in its fully raised position and the tailgate doors 52, 54 are fully closed. This provides horizontal support and stability to both the tailgate doors 52, 54 and the vertically adjustable bed 38.

Figure 3:
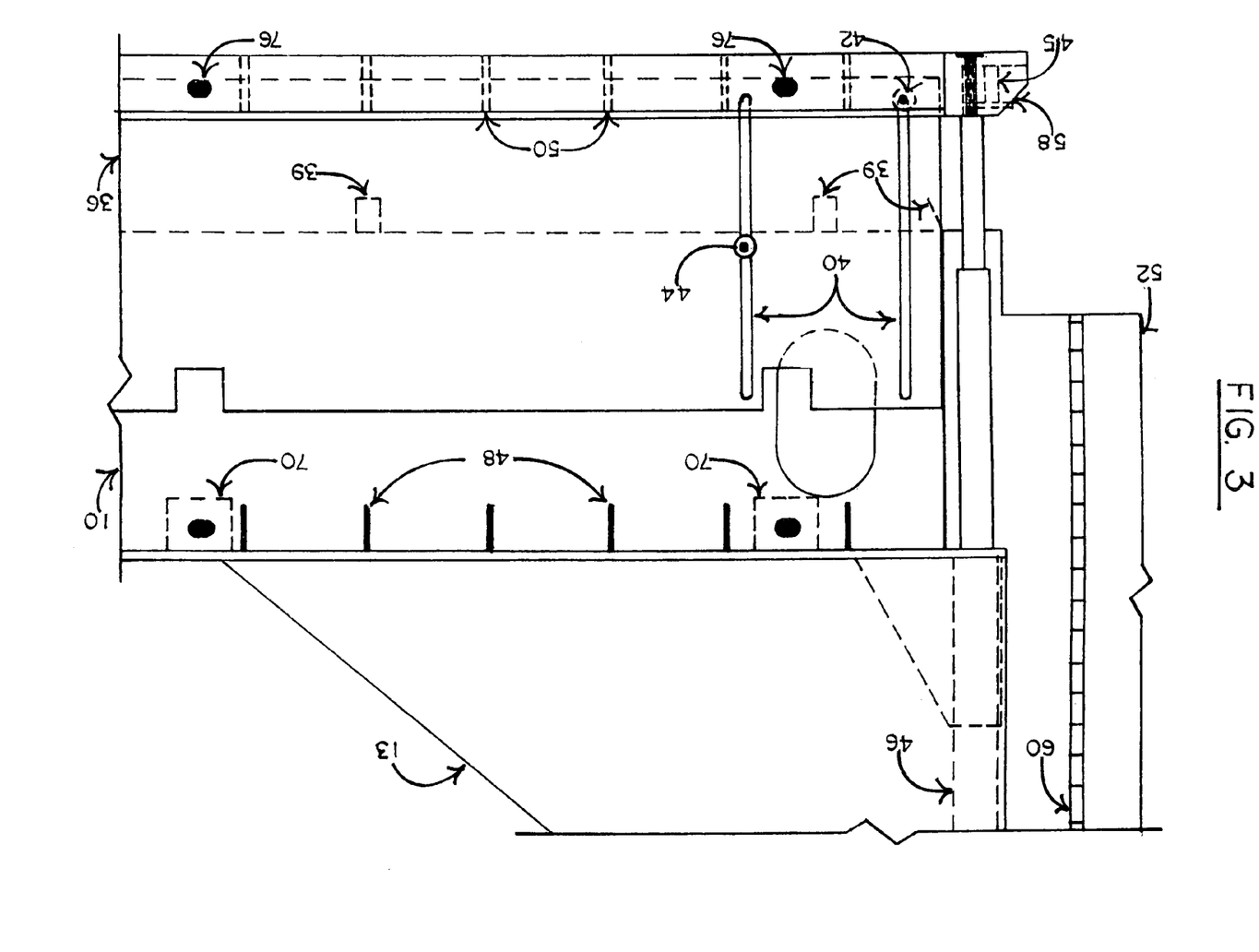
FIG. 3 is a side view of the inside of the U-shaped frame showing the safety curtain, bed locking pins and vertically adjustable bed in its lowered (loading) position.

With reference to FIG. 3, a safety curtain 36 extends around the perimeter of the U-shaped frame 10. The safety curtain 36 is located around the U-shaped frame 10 to prevent a person (not shown) or small animal (not shown) from going under the vertically adjustable bed 38 when it is being raised or lowered. The safety curtain 36 is automatically raised and lowered as the vertically adjustable bed 38 is raised and lowered. A plurality of safety curtain guide pin slots 40 on the safety curtain 36 slidably receive safety curtain guide pins 42 that are fixed to the vertically adjustable bed 38. The safety curtain guide pins 42 slide vertically in the safety curtain guide pin slots 40 as the vertically adjustable bed 38 is raised and lowered. The safety curtain 36 maintains its position through engagement of a plurality of safety curtain frame guide pins 44 that are disposed on and fixedly attached to the U-shaped frame 10. The safety curtain frame guide pins 44 slidably engage the safety curtain guide pin slots 40 as the vertically adjustable bed 38 is raised and lowered.

Figure 4:
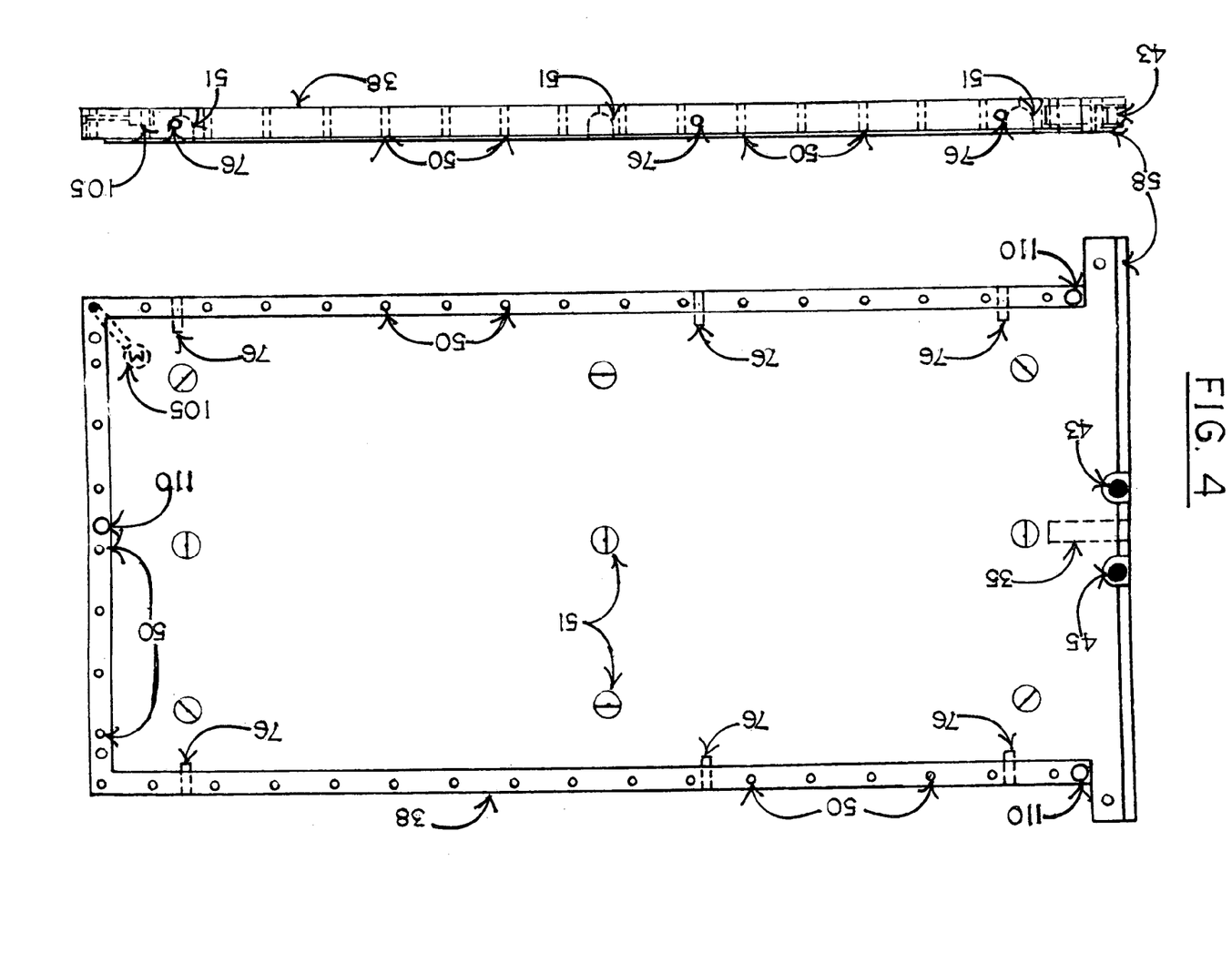
FIG. 4 is a top view of the vertically adjustable bed.

Referring to FIG. 4, the vertically adjustable bed 38 is shown with a view from the top. The rear bed edge 58, located at the rear of the vertically adjustable bed 38, has a beveled edge, beveled to at least a 45° angle, that is designed to fit into the tailgate lateral recess 64 located on the bottom region of the tailgate doors 52,54. Located around the perimeter of the vertically adjustable bed are a plurality of bed centering pin locators 50 that are designed to receive the bed centering pins 48 to give the vertically adjustable bed 38 horizontal stability. The right and left tailgate latching pins 43,45 secure the left and right tailgate doors 52,54 to the vertically adjustable bed 38. The bed locking pin recesses 76 receive the bed locking pins 70. The bed locking pins 70, when fully inserted into the bed locking pin recesses 76, secure the vertically adjustable bed 38 to the U-shaped frame 10. A trailer hitch recess 35 receives an optional trailer hitch (not shown). A plurality of cargo bed tie down recesses 51 are designed to receive ropes (not shown), stretchable cords (not shown), or other similar devices used to secure cargo (not shown) to the vertically adjustable bed 38. A microphone 105 is located on the underside and near the front of the vertically adjustable bed 38 to transmit noise coming from beneath the vertically adjustable bed 38. The microphone 105 is a safety feature designed to send a signal to the processor 100 to stop the downward movement of the vertically adjustable bed 38 if a loud noise occurs, such as from the scream of a person or animal trapped under the vertically adjustable bed 38.

Figure 5:
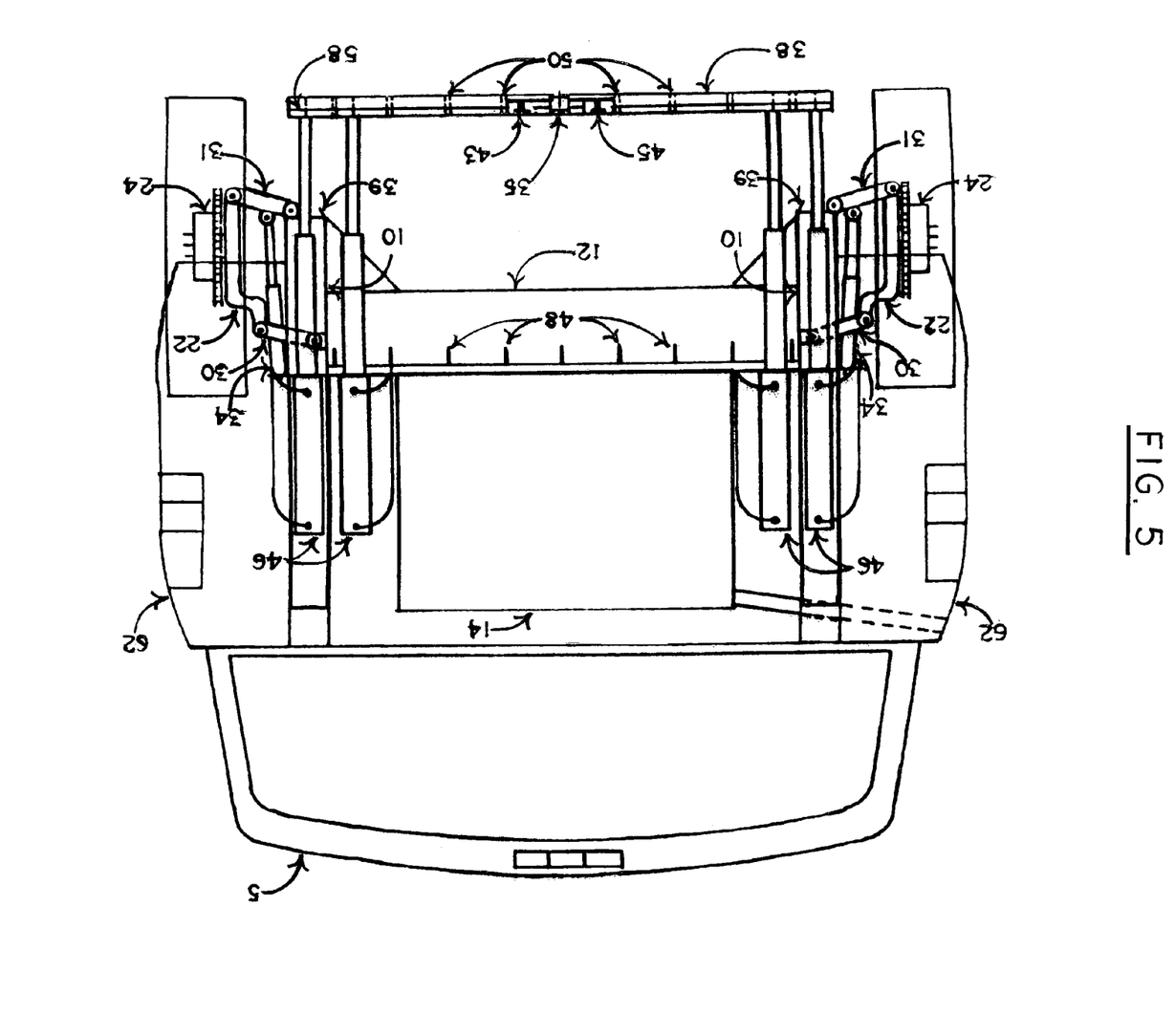
FIG. 5 is a rear view of the U-shaped frame, rear suspension assembly and vertically adjustable bed in its lowered (loading) position.

With reference to FIG. 5, the vertically adjustable bed 38 is disposed in the U-shaped frame 10. The vertically adjustable bed 38 is attached to at least four hydraulic cylinders 46. At least two hydraulic cylinders 46 are disposed forwardly on the frame cross member 12 supporting the gas tank 14 and at least two hydraulic cylinders 46 are disposed rearwardly, one each located at the end of the U-shaped frame 10. The hydraulic cylinders 46 allow the vertically adjustable bed 38 to move both upwardly and downwardly while maintaining the vertically adjustable bed 38 in a substantially horizontal orientation. The vertically adjustable bed 38 is attached to each of the hydraulic cylinders 46 at the bottom region of each of the hydraulic cylinders 46. The hydraulic cylinders 46 are controlled by a processor 100 to coordinate and synchronize the up and down movement of the vertically adjustable bed 38. In a preferred embodiment, the hydraulic cylinders 46 are double action, telescoping hydraulic cylinders, with a load carrying capacity of at least 1500 lbs. each and a vertical stroke of at least 61 cm (24 in.).

Again with reference to FIG. 5, a plurality of bed centering pins 48 are disposed around the perimeter of the U-shaped frame 10. When the vertically adjustable bed 38 is in the fully raised position, the bed centering pins 48 are inserted into the corresponding bed centering pin locators 50 on the vertically adjustable bed 38. The bed centering pins 48, when fully inserted into the bed centering pin locators 50 on the vertically adjustable bed 38, provide structural integrity and frame support to the U-shaped frame. The bed centering pins 48 are designed to positively locate the vertically adjustable bed 38 with respect to the U-shaped frame when the vertically adjustable bed 38 is in a fully raised position.

Figure 6:
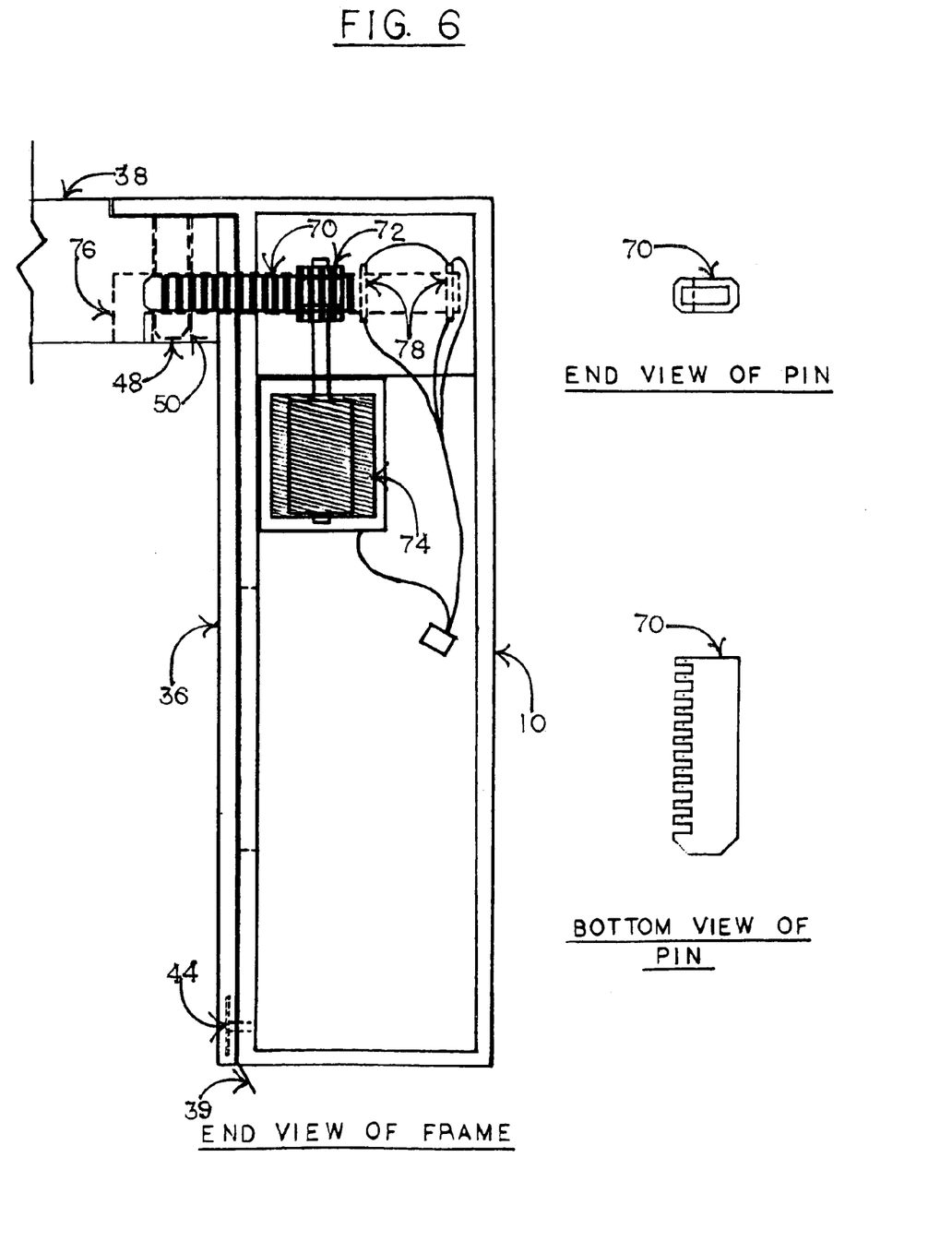
FIG. 6 is a view of the bed locking pin, bed locking pin drive motor and drive gear.

With reference to FIG. 6, a plurality of bed locking pins 70 are disposed within the U-shaped frame 10. Each bed locking pin 70 is driven into either a full in or full out position by a drive gear 72. The drive gear 72 is moved by a bed locking pin drive motor 74. The bed locking pin drive motor 74 is powered by a power supply (not shown) and controlled by the processor 100 to insert or remove the bed locking pins 70 into the bed locking pin recesses 76 located on the vertically adjustable bed 38. The bed locking pins 70, when fully inserted into the bed locking pin recesses 76 on the vertically adjustable bed 38, provide structural integrity and frame support to the U-shaped frame and locks the vertically-adjustable bed 38 in its horizontal position while the truck 5 is in the transport mode. Bed locking pin position sensors 78 provide electronic signal indication to the processor 100 that a bed locking pin 70 is in either the fully out or fully in position.

Figure 7:
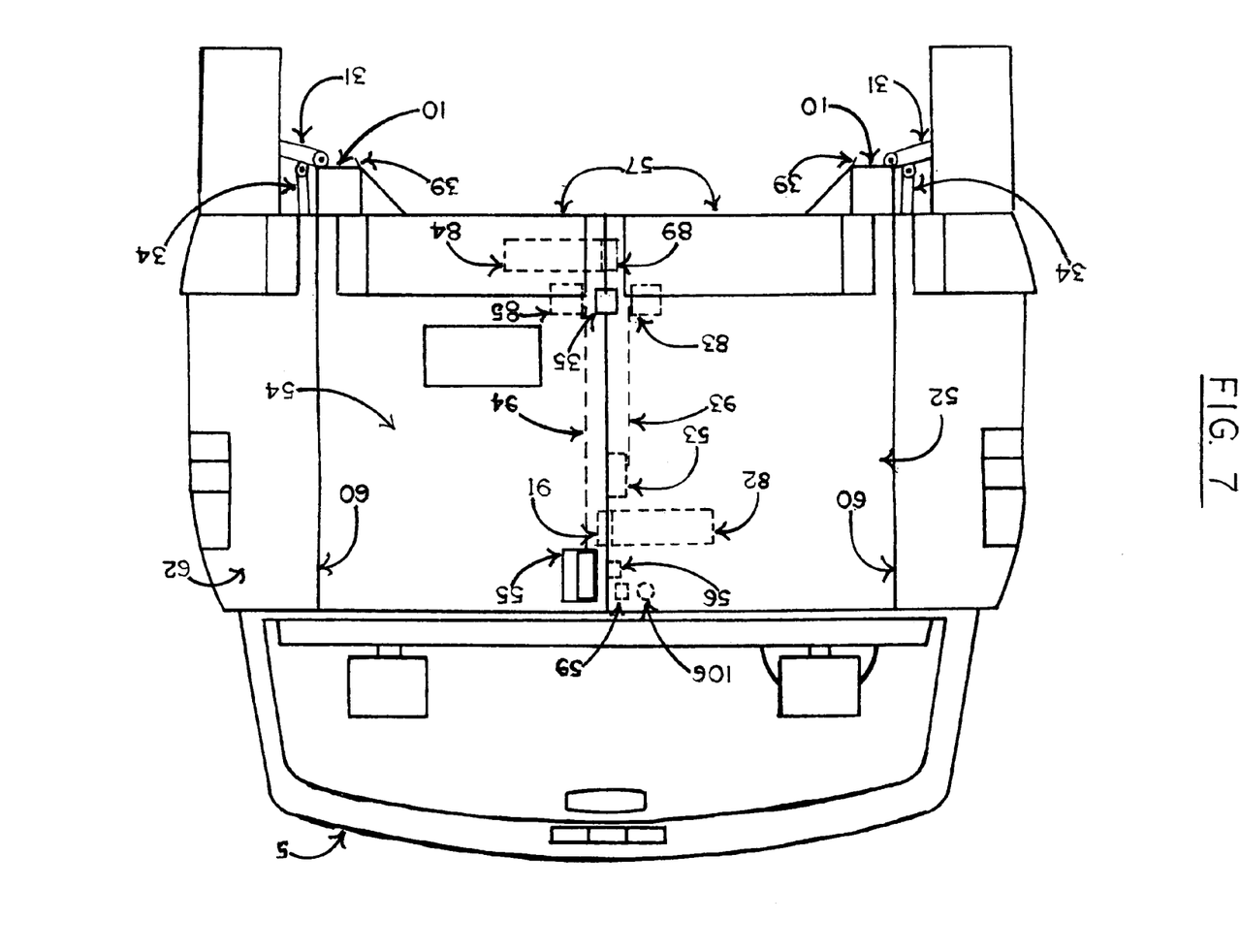
FIG. 7 is a rear view of the left and right tailgate doors.

With reference to FIG. 7, the tailgate assembly is comprised of a left tailgate door 52 and a right tailgate door 54. Both tailgate doors 52,54 must be in the full open position in order to lower the vertically adjustable bed 38. A rocker switch 59 is disposed on the left tailgate door 52 and is a spring-loaded switch used to activate the upward and downward motion of the vertically adjustable bed 38. A microphone bypass switch 56 is disposed on the left tailgate door 52 and is used to bypass a lock out signal generated by the microphone 105 located on the underside of the vertically adjustable bed 38. A bumper 57 is attached to the lower region of the left tailgate door 52 and the right tailgate door 54. When the vertically adjustable bed 38 is raised to its highest position, the left tailgate door 52 is manually closed and then the right tailgate door 54 is manually closed. The right tailgate door handle 55 is located on the right tailgate door 54. The right tailgate door handle 55 contains a two-position switch (not shown) with built-in contactors (not shown). The right tailgate door handle 55 can be opened to a first position that is between 0° and 90° and a second position that is greater than 90°. The preferred embodiment for the first position of the tailgate door handle is 45° and 90° for the second position. When the left tailgate door 52 and right tailgate door 54 are closed, they receive the rear edge 58 of the vertically adjustable bed 38 into lateral recess 64 located at the bottom region of each of the tailgate doors 52,54. The lateral recess 64 in the tailgate doors 52,54 receives the rear edge 58 of the vertically adjustable bed 38 and provides frame stability and structural integrity to the U-shaped frame.

Figure 8:
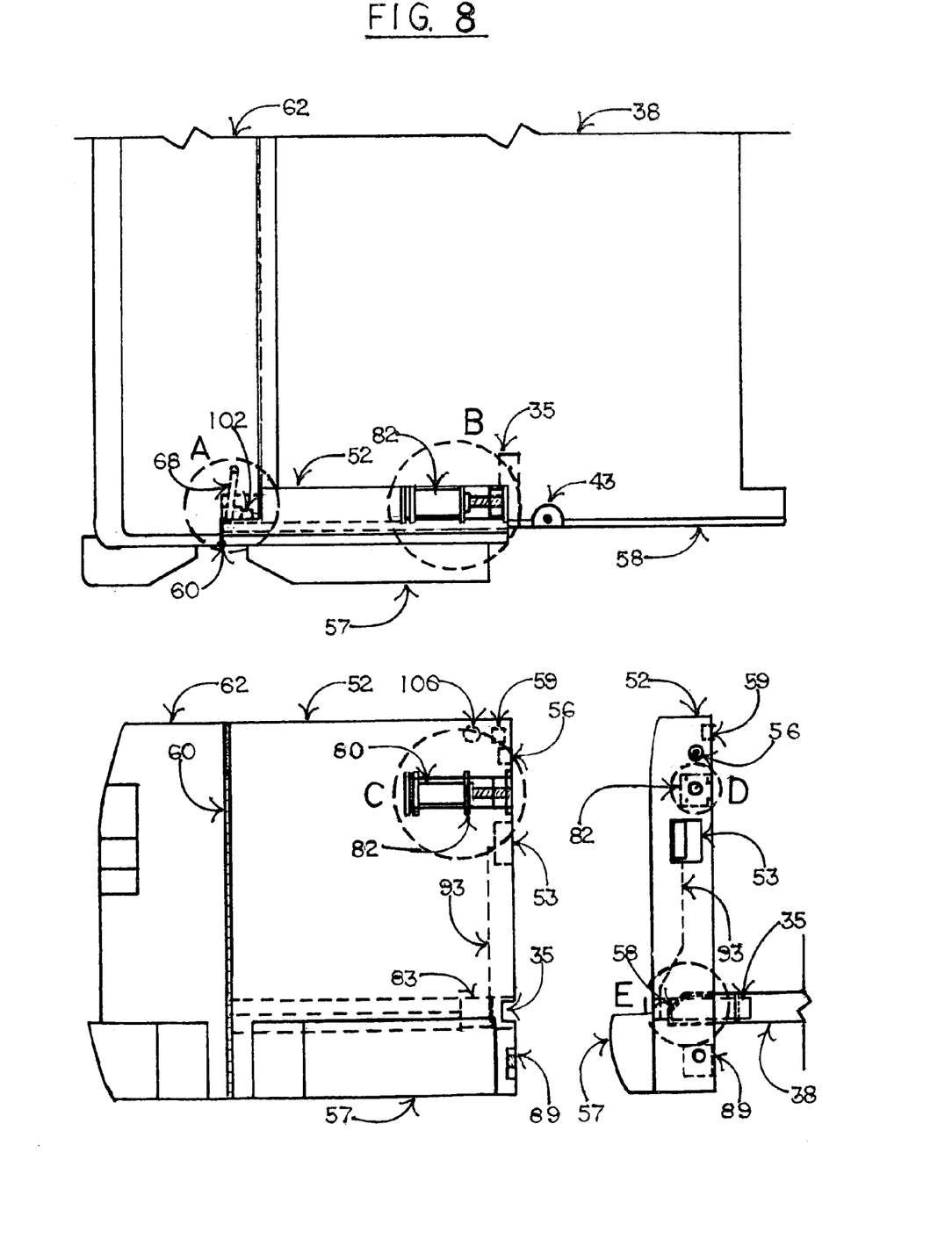
FIG. 8 shows views of the tailgate door locking screw, tailgate door locking screw drive motor, and tailgate door release rod in the left tailgate door.

With reference to FIG. 8, to provide further frame stability and structural integrity to the U-shaped frame, and to provide proper closure of the tailgate doors 52,54 while in the transporting mode, there is disclosed a tailgate door locking mechanism comprised of two tailgate door locking screws 82,84. The left tailgate door locking screw 82 is disposed in the left tailgate door 52 and the right tailgate door locking screw 84 is disposed in the right tailgate door 54. The left tailgate door locking screw 82 is driven into either a full in or full out position into or out of the right tailgate door locking screw receiving plate 89 that is located in the right tailgate door 54. The right tailgate door locking screw 84 is driven into either a full in or full out position into or out of the left tailgate door locking screw receiving plate 91 that is located on the left tailgate door 52.

Figure 9:
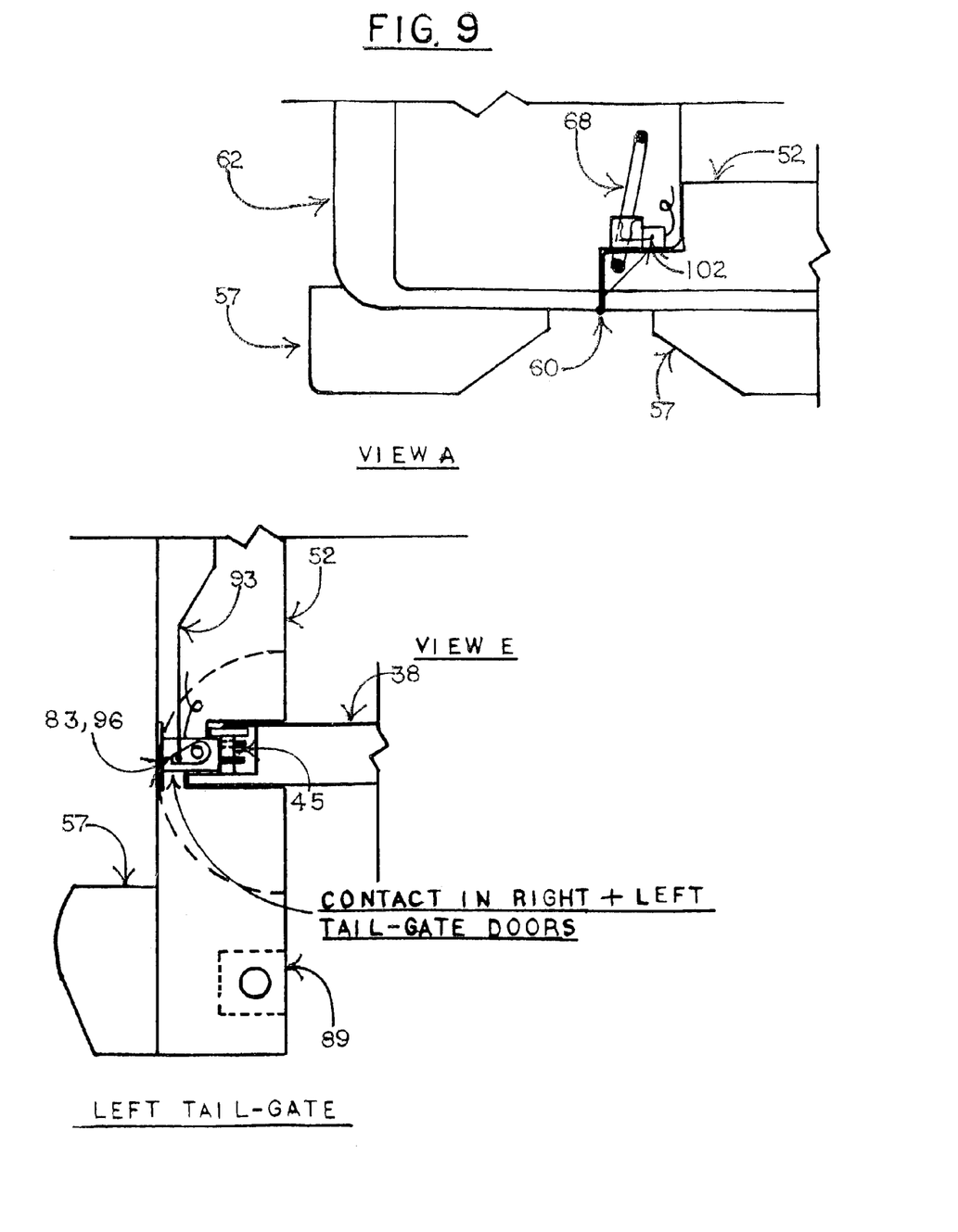
FIG. 9 is a detailed view of the tailgate latch and contact mechanism.

With reference to FIG. 9, the tailgate doors 52,54 must be fully open, to at least 90° from the fully closed position of 0°, and engage the respective tailgate door position indication contactor 102,104 in order to provide a full open position indication signal to the processor 100. The preferred embodiment for the full open tailgate door position is 120°. The tailgate positioning arms 68,69 hold the left and right tailgate doors 52,54 in the full open position. Both left and right tailgate doors 52,54 must be in the full open position and their respective position indication contactors 102,104 must be contacted to send a signal to the control system to be able to raise or lower the vertically adjustable bed 38.

Again with reference to FIG. 9, when the vertically adjustable bed 38 is in the fully raised position and the left and right tailgate doors 52,54 are fully closed, the left and right tailgate bed latches 83,85 lock into the vertically adjustable bed 38 by engaging their respective left and right tailgate latching pins 43,45. The left and right tailgate bed latches 83,85 have the left and right tailgate latch contactors 95,96 built into them respectively. The left and right tailgate door latch contactors 95,96 send signal to the processor 100 that the left and right tailgate doors 52,54 are closed. The right tailgate door latch contactor 95 sends a signal to the processor 100 to indicate that the right tailgate latching pin 43 has been engaged. Locking the tailgate doors 52,54 to the vertically adjustable bed 38 which is locked into the U-shaped frame 10 by the bed locking pins 70 provides structural support and stability to the entire back section of the truck 5.

Figure 10:
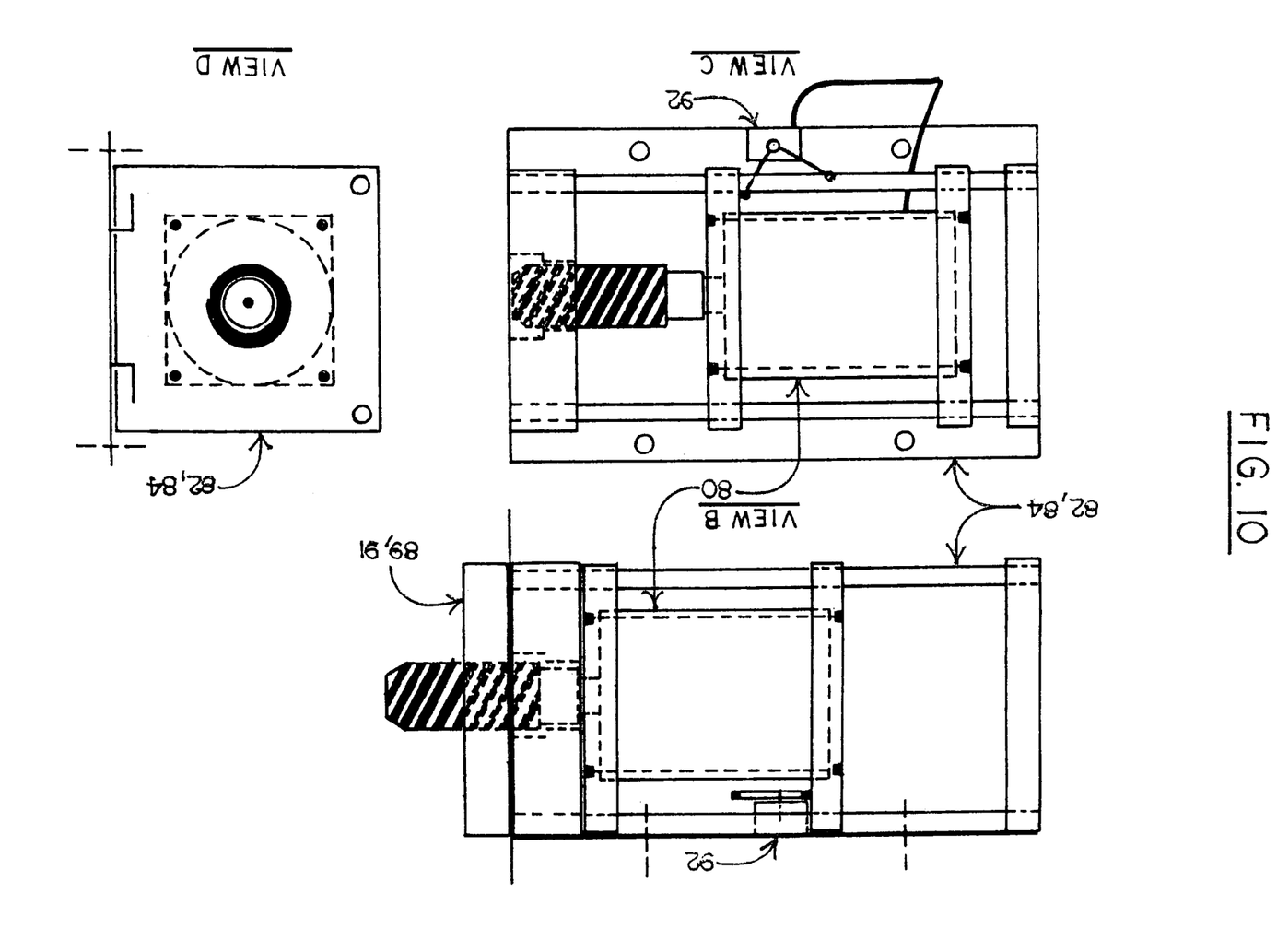
FIG. 10 is a detailed view of the tailgate door locking screw and tailgate door locking screw drive motor.

With reference to FIG. 10, the tailgate door locking screw drive motor 80 acts to drive the tailgate door locking screw 82 on the left tailgate door 52 either into or out of the right tailgate door locking screw receiving plate 91 in the right tailgate door 54. When the left tailgate door locking screw 82 is driven into right tailgate door locking screw receiving plate 91 in the right tailgate door 54 and the right tailgate door locking screw 84 is driven into left tailgate door locking screw receiving plate 89 in the left tailgate door 52, the left and right tailgate doors 52,54 are locked and the truck is in the transport position. Limit switches 92 provide positive indication that the tailgate door locking screws 82,84 are in the full in or full out position. The tailgate door locking screws 82,84 when fully inserted into the right tailgate door 54 and the left tailgate door 52 provide structural integrity and support to the U-shaped frame by locking the left side of the U-shaped frame 10 to the right side.

Figure 11:
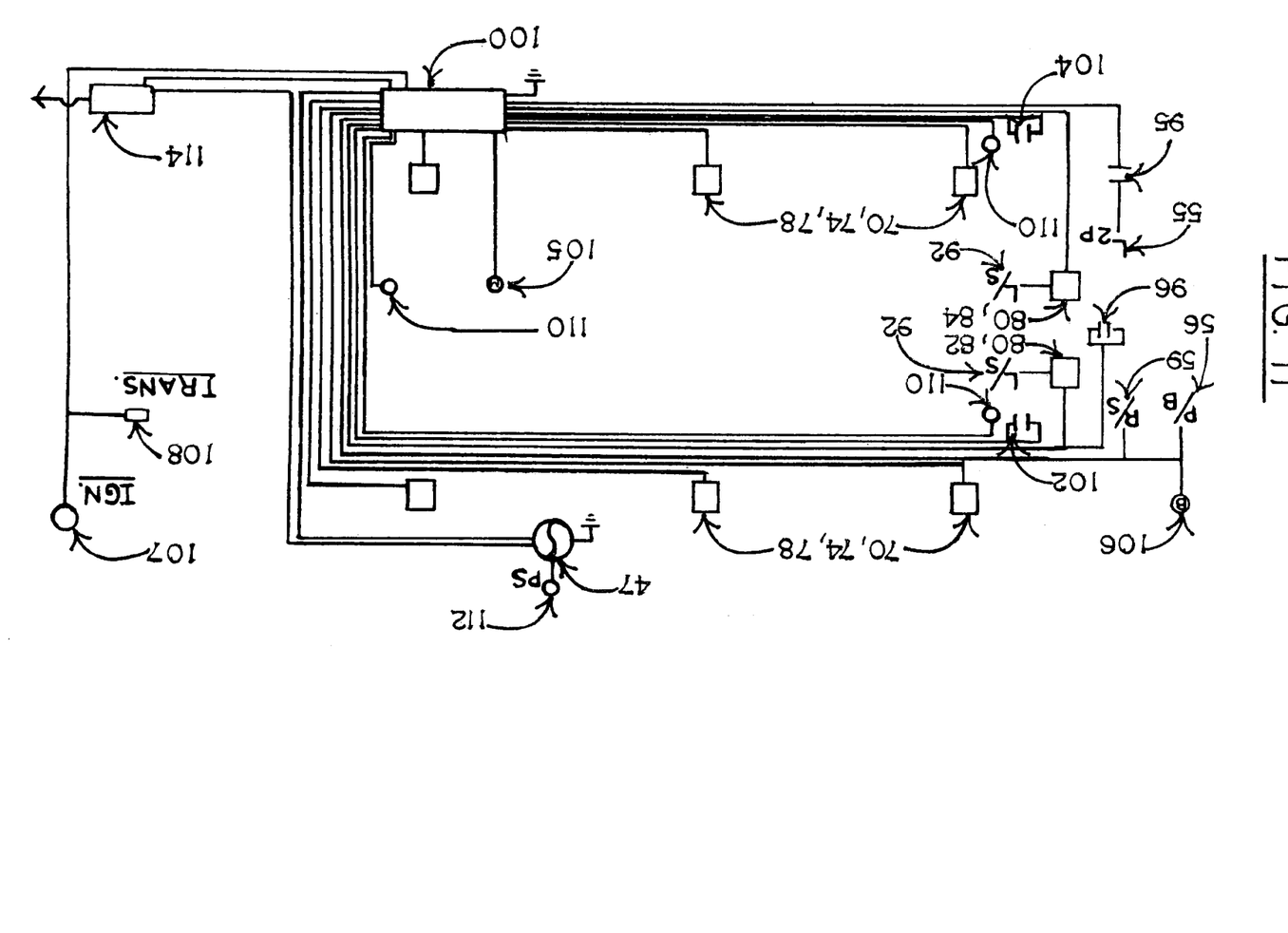
FIG. 11 is the control schematic for raising and lowering the adjustable bed.

FIG. 11 discloses the processor 100, controls, switches and interlocks related to the operation of the vertically adjustable truck bed 38. To lower the vertically adjustable bed 38, right tailgate door handle 55 is manually opened to its first position, preferably 45° from its closed position of 0°. When the right tailgate door handle 55 is opened to its first position, the built in contactor in the right tailgate door handle 55 sends a signal to the processor 100 to disengage the right and left tailgate locking screws 82,84 from the respective tailgate locking screw receiving plates 89,91. When the tailgate locking screws 82,84 are fully disengaged, the cycle bell 106 is given a signal from the processor 100 to announce completion of the cycle. When the right tailgate door handle 55 is manually moved to its second position, preferably 90° from the first position of 45°, the right tailgate bed latch 85 is released from the right tailgate bed latching pin 43. The right tailgate door 54 is then opened to its full open position, at least 90° and preferably 120° from its closed position of 0°, to trigger the right tailgate door position indication contactor 104. The left tailgate door handle 53 is then manually opened to its fully open position, at least 45° and preferably 90° from the 0° closed position, which releases the left tailgate bed latch 83 from the left tailgate bed latching pin 45. The left tailgate door 52 is then opened to its full open position, at least 90° and preferably 120° from its closed position of 0°, to trigger the left tailgate door position indication contactor 102. With both tailgate doors 52,54 fully open, rocker switch 59 is manually depressed and held in the down position. Manually holding rocker switch 59 in the down position sends a signal to the processor 100 to disengage the bed locking pins 70 from the vertically adjustable bed 38. When the bed locking pins 70 are fully withdrawn from the vertically adjustable bed 38, the processor 100 sends a signal to the hydraulic pump 47 which pumps hydraulic fluid to the upper chamber of the hydraulic cylinders 46 which will move the vertically adjustable bed 38 downwardly. Pressure switch 112 will automatically shut off power to the hydraulic pump 47 if the pressure switch receives an overpressure signal. After each cycle is complete, the processor 100 sends a signal to the cycle bell 106 to announce the successful completion of the cycle.

To raise the vertically adjustable bed 38, rocker switch 59 is manually depressed and held in the up position. Manually holding rocker switch 59 in the up position sends a signal to the processor 100 which relays a signal to the hydraulic pump 47 to pump hydraulic fluid to the lower chamber of the hydraulic cylinders 46 which will move the vertically adjustable bed 38 upwardly. Pressure switch 112 will automatically shut off power to the hydraulic pump 47 if the pressure switch receives an overpressure signal. When in its fully raised position, the vertically adjustable bed 38 makes contact with a plurality of proximity switches 110 located on the U-shaped frame 10. The proximity switches 110 send a signal to the processor 100 which relays a signal to engage the bed locking pins 70 for insertion into the bed locking pin recesses 76 in the vertically adjustable bed 38. When the bed locking pins 70 are fully inserted into the vertically adjustable bed 38, the cycle bell 106 will sound. When the left tailgate door 52 is manually closed to its fully closed position, the left tailgate bed latch 83 latches to the left tailgate bed latching pin 45. The built in contactor in the left tailgate bed latch 83 sends a signal to the processor 100. The right tailgate door 54 is then manually closed to its fully closed position the right tailgate bed latch 85 latches to the right tailgate bed latching pin 43 and a signal is given to the processor 100. When the right tailgate door handle 55 is in its fully closed position of 0°, then the processor 100 will send a signal to the tailgate locking screw drive motors 80,81 and the tailgate door locking screws 82,84 will be inserted into their respective tailgate door locking screw receiving plates 89,91. When the tailgate door locking screws 82,84 are fully inserted, limit switches 92 provide a signal to the processor 100 to allow the transmission interlock 108 to be disengaged. Unless the transmission interlock 108 is disengaged, the transmission (not shown) cannot be shifted into the drive position.

It should be understood that the foregoing is illustrative of particular embodiments of the invention, and particular applications thereof, and it is not meant to be a limitation upon the invention in any way. In view of the disclosures presented herein, yet other variations of the truck with vertically adjustable bed and structural support mechanisms being disclosed will be apparent to one of skill in the art. It is the following claims, including all equivalents, which define the scope of the invention.

What is claimed is:

1. A truck with a vertically adjustable bed comprising:
   (a) a vertically adjustable truck bed, the vertically adjustable truck bed operatively disposed within a U-shaped frame;
   (b) two rear suspension support assemblies, the rear suspension support assemblies operatively disposed on each side of the U-shaped frame and comprising:
      i. a wheel support bracket, the wheel support bracket attached to the rear wheel hub;
      ii. a leaf spring support bracket;
      iii. a leaf spring rocker support bracket;
      iv. a shock absorber mounting plate;
      v. a leaf spring pivot arm, the leaf spring pivot arm rotatably connected at one end to the U-shaped frame;
      vi. two leaf springs, each leaf spring being disposed on an opposite side of the U-shaped between the leaf spring support bracket and the leaf spring rocker support bracket;
      vii. at least two rocker arm assemblies, each rocker arm assembly comprising an upper rocker arm and a lower rocker arm;
      viii. an upper rocker arm, the upper rocker arm being rotatably attached to the top region of the wheel support bracket;
      ix. a lower rocker arm, the lower rocker arm being rotatably attached to the bottom region of the wheel support bracket;
      x. at least two shock absorbers, each shock absorber being attached to the shock absorber mounting plate and the lower end of each shock absorber attached to the lower rocker arm;
   (c) a means for raising and lowering the vertically adjustable bed comprising at least four hydraulic cylinders, each hydraulic cylinder being suitably attached to the U-shaped frame and the bottom end of each hydraulic cylinder being suitably attached to the vertically adjustable bed;
   (d) a hydraulic pump, the hydraulic pump operatively connected to provide hydraulic fluid to each of the hydraulic cylinders;
   (e) two tailgate doors, the tailgate doors hingedly connected to the U-shaped frame;
   (f) a vertically adjustable bed locking assembly; the vertically adjustable bed locking assembly comprising:
      i. at least two bed locking pins, the bed locking pins being disposed within the U-shaped frame;
      ii. at least two bed centering pins, the bed centering pins being disposed on the U-shaped frame and adapted to be inserted into the vertically adjustable bed;
      iii. at least two bed locking pin drive motors, the bed locking pin drive motors operatively connected to drive bed locking pin drive gears;
      iv. at least two bed locking pin drive gears, the bed locking pin drive gears being driven by the bed locking pin drive motors to insert or remove the bed locking pins; and
   (g) a tailgate door locking assembly including:
      i. at least one tailgate door locking screw, the tailgate door locking screw being disposed within the tailgate door and operatively connected to be driven into a tailgate door locking screw receiving plate;
      ii. at least one tailgate door locking screw receiving plate, the tailgate door locking screw receiving plate being disposed within the tailgate door to receive a tailgate door locking screw;
      iii. at least one tailgate door locking screw drive motor, the tailgate door locking screw motor operatively connected to the tailgate door locking screw to insert or remove the tailgate door locking screw from the tailgate door locking screw receiving plate;
   (h) a control system comprising:
      i. a processor; and
      ii. control electronics, the control electronics operatively connected to the processor.

2. The truck with a vertically adjustable bed of claim 1, wherein the hydraulic cylinders are comprised of double acting hydraulic cylinders.

3. The truck of claim 1, further comprising a tailgate door handle with a two-position switch.

4. The truck with a vertically adjustable bed of claim 1, further comprising a tailgate door latch with a position contactor disposed within the tailgate door latch.

5. The truck with a vertically adjustable bed of claim 1, wherein the control system further includes a microphone.

6. The truck with a vertically adjustable bed of claim 1, further comprising a safety curtain assembly, the safety curtain assembly comprising:
   (a) a safety curtain;
   (b) at least two safety curtain guide pins; and
   (c) at least two bed guide pin openings in sliding relation with the safety curtain guide pins.

* * * * *